(12) United States Patent
Hu et al.

(10) Patent No.: US 8,516,073 B2
(45) Date of Patent: Aug. 20, 2013

(54) METHOD, DEVICE AND SYSTEM FOR TRANSFERRING INFORMATION

(75) Inventors: Huadong Hu, Shenzhen (CN); Yali Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 12/946,600

(22) Filed: Nov. 15, 2010

(65) Prior Publication Data

US 2011/0060811 A1    Mar. 10, 2011

Related U.S. Application Data

(63) Continuation of application No. PCT/CN2009/071656, filed on May 6, 2009.

(30) Foreign Application Priority Data

May 15, 2008   (CN) .......................... 2008 1 0067293

(51) Int. Cl.
*G06F 15/16* (2006.01)

(52) U.S. Cl.
USPC ..................... 709/217; 709/218; 709/220

(58) Field of Classification Search
None
See application file for complete search history.

(56) References Cited

U.S. PATENT DOCUMENTS

| 7,526,484 B2 | 4/2009 | El-Shimi et al. | |
| 7,607,138 B2 * | 10/2009 | Donovan et al. | 719/318 |
| 8,086,216 B2 * | 12/2011 | Feder et al. | 455/405 |
| 2006/0104233 A1 | 5/2006 | Zhang | |
| 2007/0071218 A1 | 3/2007 | Zhang | |
| 2007/0265945 A1 | 11/2007 | Schimpf | |
| 2008/0229385 A1 * | 9/2008 | Feder et al. | 726/1 |
| 2008/0320564 A1 | 12/2008 | Duan | |
| 2010/0146596 A1 * | 6/2010 | Stenfelt et al. | 726/4 |
| 2010/0150003 A1 * | 6/2010 | Andreasen et al. | 370/252 |
| 2010/0186064 A1 * | 7/2010 | Huang et al. | 726/1 |
| 2010/0257582 A1 * | 10/2010 | Zamora et al. | 726/1 |
| 2011/0082776 A1 * | 4/2011 | Stenfelt | 705/30 |
| 2011/0128907 A1 * | 6/2011 | Kvernvik | 370/328 |
| 2011/0131313 A1 * | 6/2011 | Zhou et al. | 709/223 |
| 2011/0138066 A1 * | 6/2011 | Kopplin et al. | 709/228 |
| 2012/0096177 A1 * | 4/2012 | Rasanen | 709/228 |
| 2012/0195196 A1 * | 8/2012 | Ghai et al. | 370/235 |

FOREIGN PATENT DOCUMENTS

| CN | 1452066 A | 10/2003 |
| CN | 1627715 A | 6/2005 |
| CN | 1645805 A | 7/2005 |
| CN | 1645806 A | 7/2005 |
| CN | 1732264 A | 2/2006 |

(Continued)

OTHER PUBLICATIONS

Office Action issued in corresponding Chinese Patent Application No. 200810067293.X, mailed Sep. 26, 2010.

(Continued)

*Primary Examiner* — Firmin Backer
*Assistant Examiner* — Keyvan Emdadi (57) ABSTRACT

A method of information transfer, comprising receiving an event report and sending the event report if the report matches event report subscription information. A policy and charging rule function (PCRF) and mobile communication system are also disclosed in the present invention, thereby enabling the system to save network resources and increase the utilization of network resources.

9 Claims, 6 Drawing Sheets

(56) References Cited

FOREIGN PATENT DOCUMENTS

| | | |
|---|---|---|
| CN | 1848875 A | 10/2006 |
| CN | 101583152 B | 8/2011 |
| EP | 1841142 A1 | 10/2007 |
| WO | WO 2007/142565 A1 | 12/2007 |

OTHER PUBLICATIONS

International Search Report issued in corresponding PCT Patent Application No. PCT/CN2009/071656, mailed Aug. 13, 2009.
Change Request 29.212 CR 082 rev 1, 7.4.0, 3GPP TSG-CT WG3 Meeting #47b, C-3-080430. Sophia Antipolis, France, Feb. 31-Mar. 3, 2008.
Change Request 29.212 CR 082 rev, 7.4.0, 3GPP TSG-CT WG3 Meeting #47b, C3-080367. Sophia Antipolis, France, Feb. 31-Mar. 3, 2008.
Change Request 29.212 CR 089 rev 2, 7.4.0, 3GPP TSG-CT WG3 Meeting #48, C3-080837. Cape Town, South Africa May 5-9, 2008.
Change Request 29.212 CR 082 rev 3, 7.4.0, 3GPP TSG-CT WG3 Meeting #48, C3-080823. Cape Town, South Africa May 5-9, 2008.
GSM, "3$^{rd}$ Generation Partnership Project; Technical Specification Group Services and System Aspects; Policy and Charging Control Architecture" (Release 8). 3GPP TS 23.203, V8.1.1, Mar. 2008.
GSM, "3$^{rd}$ Generation Partnership Project; Technical Specification Group Services and System Aspects; Policy and Charging Control Architecture" (Release 7). 3GPP TS 23.203, V7.6.0, Mar. 2008.
Written Opinion of the International Searching Authority issued in corresponding PCT Patent Application No. PCT/CN2009/071656, mailed Aug. 13, 2009.
Search report issued in corresponding Chinese application No. 201110266033.7, dated May 10, 2013, total 2 pages.

* cited by examiner

METHOD, DEVICE AND SYSTEM FOR TRANSFERRING INFORMATION

This application is a continuation of International Application No. PCT/CN2009/071656, filed on May 6, 2009, which claims priority to Chinese Patent Application No. 200810067293.X, filed on May 15, 2008, both of which are hereby incorporated by reference in their entireties.

FIELD OF THE INVENTION

The present invention relates to a communication field, and in particular, to a method, device and system for transferring information.

BACKGROUND OF THE INVENTION

To keep a telecom network operable, services in the network and resources consumed by these services must be controlled in an accurate, timely and complete manner. Policy and charging control of service is one of the important controls to enable the operation of the telecom network.

Figure 1:
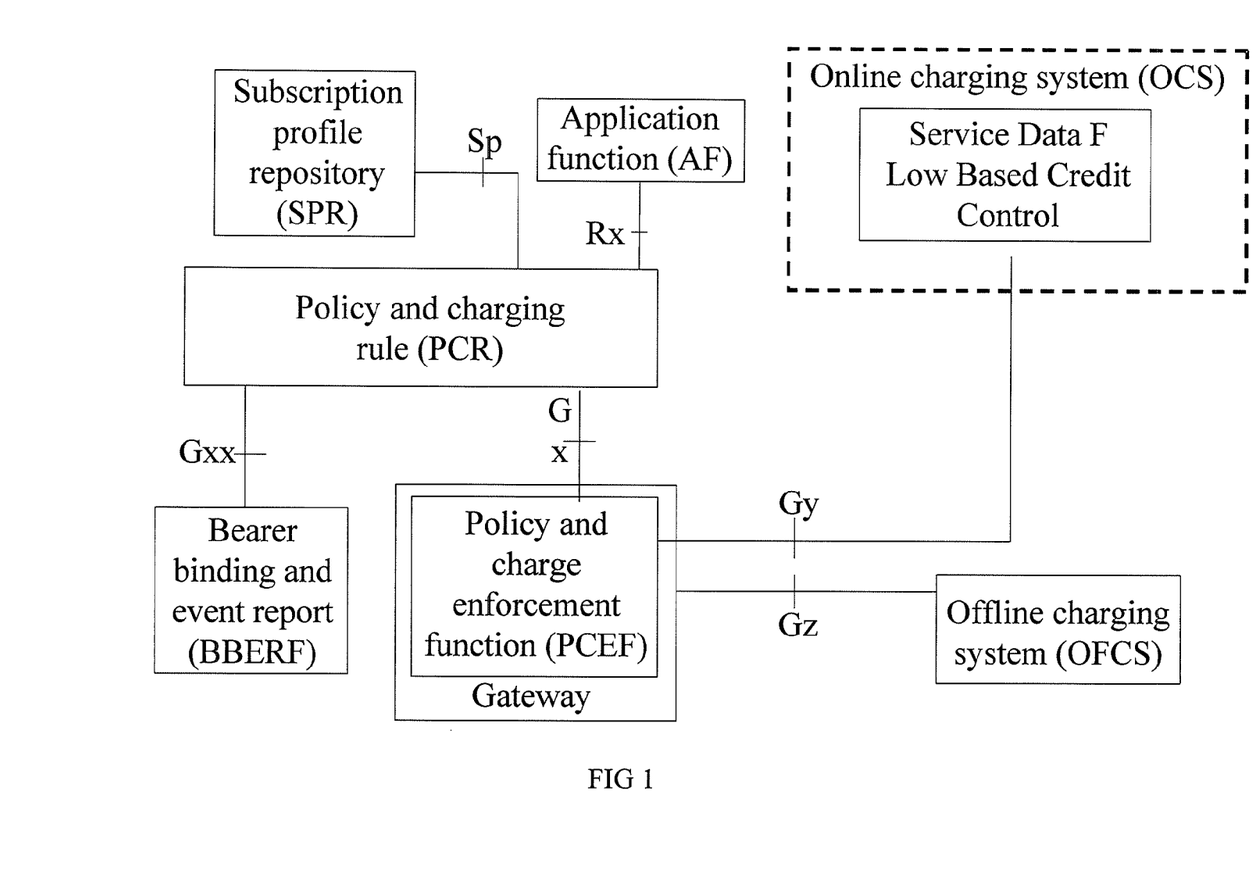
FIG. 1 shows a PCC structure in the prior art.

The 3rd Generation Partnership Project (3GPP) system stipulates a Policy and Charging Control (PCC) framework, as shown in FIG. 1. A Policy and Charging Rules Function (PCRF) forms the core part of the PCC system and is configured to set a PCC rule. The PCRF sends a PCC rule to a Policy and Charging Enforcement Function (PCEF) for implementation. In addition, the PCRF need to ensure that a network control rule matches subscription data. The PCRF sets a PCC rule based on the following: service-related information obtained from an Application Function (AF), subscription-related information obtained from a Subscription Profile Repository (SPR), and information relating to a bearer network obtained from the PCEF. The PCEF is designed to perform traffic charging according to a PCC rules from the PCRF. Such charging operations can be performed online or offline. For online charging, the PCEF works with an Online Charging System (OCS) for credit management; for offline charging, the PCEF exchanges related charging information with an Offline Charging System (OFCS). Moreover, the PCEF is usually located on a network gateway (GW).

A Bearer Binding and Event Report Function (BBERF) is used to execute a Quality of Service (QoS) rule. The BBERF is generally located on an IP access gateway, such as a Serving GW in a System Architecture Evolution (SAE) network or Mobile Access Gateway (MAG) in a non-3GPP network. While sending a QoS rule, the PCRF informs the BBERF of a triggering event type to indicate that the BBERF reports an event to the PCRF when a matched triggering event occurs and requests for a QoS rule. The BBERF checks service data flows according to a traffic filter defined in the rule from the PCRF and implements policy control on these service flows as required by the PCRF.

A BBERF and Gxx interface described in the preceding architecture are optional. When the BBERF and Gxx interface exist, a mobile IP tunnel is established between the network entities, where the BBERF and PCEF are located, and the network entities communicate through protocol such as Mobility IP (MIP) or Proxy Mobility IP (PMIP). In this situation, certain 3GPP-defined parameters cannot be transferred between the BBERF and PCEF through an MIP message. As there's no bearer concept in the MIP or PMIP protocol, a bearer-related event can be recognized by the BBERF but not by the PCEF. Nevertheless, the PCEF needs to perform charging control according to the bearer-related event and the BBERF also need perform policy control according to an event that occurs on the PCEF.

In the prior art, the PCRF supports information transfer between the BBERF and PCEF, which enables the forwarding of information and messages that cannot be transferred between the BBERF and PCEF through an MIP message. The BBERF and PCRF set up a gateway control session and the PCRF sends a triggering event type that requires BBERF monitoring to the BBERF and if an event report reported by the BBERF is forwarded to the PCEF via the PCRF. When detecting the occurrence of an event and the event can match the triggering event type sent from the PCRF, the BBERF will report the event report to the PCRF, which in turn forwards the event report to the PCEF through a policy and charging rule provisioning message. The PCEF and PCRF set up an IP Connectivity Access Network (IP-CAN) session and the PCRF sends a triggering event type that requires PCEF monitoring to the PCEF if an event report reported by the PCEF is forwarded to the BBERF via the PCRF. When detecting the occurrence of an event and the event can match the triggering event type sent from the PCRF, the PCEF will report the event report to the PCRF, which in turn forwards the event report to the BBER.

The prior art provides a mechanism to transfer an event report between the BBERF and PCEF via the PCRF. However, the PCEF actually do not necessarily require all event reports from the BBERF but need event reports of certain types. Similarly, the BBERF does not necessarily need all event reports from the PCEF. Nevertheless, under the prior mechanism, the PCRF forwards all event reports to the BBERF and PCEF, causing a large amount of redundant information and a waste of network signaling resources. Moreover, an operator usually deploys a small number of PCRF nodes in a network. To handle a huge amount of redundant information, the prior mechanism must consume massive PCRF resources to exchange messages between the BBERF and PCEF.

SUMMARY OF THE INVENTION

A method, device, and system for transferring information are provided in an embodiment of the present invention to save network resources and increase the utilization of network resources.

A method of information transfer is provided in an embodiment of the present invention, comprising:
 receiving event reports; and
 sending the event report if an event report matches event report subscription information.

A Policy and Rules Function (PCRF) is further provided according to an embodiment of the present invention, comprising:
 a receiving unit, configured to receive event reports; and
 a processing unit, configured to send the event reports when the event reports received by the receiving unit match event report subscription information according to the match between the event reports received by the receiving unit and event report subscription information.

Further, a mobile communication system is provided according to an embodiment of the present invention and comprises a PCRF that can communicate with other network entities. The PCRF comprises:
 a receiving unit, configured to receive event reports; and
 a processing unit, configured to send event reports if the event reports received by the receiving unit matches event report subscription information.

A method is provided in an embodiment of the present invention, whereby a network entity (BBERF or PCEF) registers the types of event reports that it needs with the PCRF. The method enables the PCRF to forward event reports only required by the BBERF and PCEF according to the subscription data. This method solves the problem in the prior that mechanism for the PCRF to transfer all event reports to the BBERF and PCEF causes a huge amount of redundant information. Therefore, the method forgoes the exchange of messages between the PCRF, and the BBERF and PCEF and saves PCRF resources.

DETAILED DESCRIPTION OF THE EMBODIMENTS

To clarify the purposes, technical solutions, and advantages of the embodiments of the present invention, the following sections will detail the embodiments based on drawings.

An embodiment of the prevent invention is based on PCC architecture that provides a BBERF and Gxx interface. Under the architecture, a mobile IP tunnel is established between the network entities, where a BBERF and PCEF are located, and the network entities communicate through protocol such as MIP or PMIP. In the embodiment, a network entity, such as BBERF or PCEF, registers the type of an event report that the network entity needs with the PCRF. The embodiment enables the PCRF to forward an event report only required by the BBERF and/or PCEF according to BBERF and/or PCEF subscription. After receiving an event report from the PCEF, the PCRF matches the event report with BBERF event report subscription information. If the event report and the BBERF event report subscription information are matched, the PCRF forwards the event report to the BBERF. Alternatively, after receiving an event report from the BBERF, the PCRF matches the event report with PCEF event report subscription information. If the event report and the PCEF event report subscription information are matched, the PCRF forwards the event report to the PCEF. The PCRF can determine a type of triggering event sent to the PCEF according to a type of event report to which the BBERF subscribes in a gateway control session relating to an IP-CAN session and other factors. Alternatively, the PCRF can determine a type of triggering event sent to the BBERF according to a type of event report to which the PCEF subscribes in a gateway control session relating to an IP-CAN session and other factors. Accordingly, the PCEF can also update event report subscription of the PCEF to the PCRF according to a type of credit reauthorization event the PCEF has received. The embodiment may also designate a special event report type to indicate that the PCRF may forward an event report without matching the event report with subscription information for the purpose of transferring any information other than a triggering event between the BBERF and PCEF.

Figure 2:
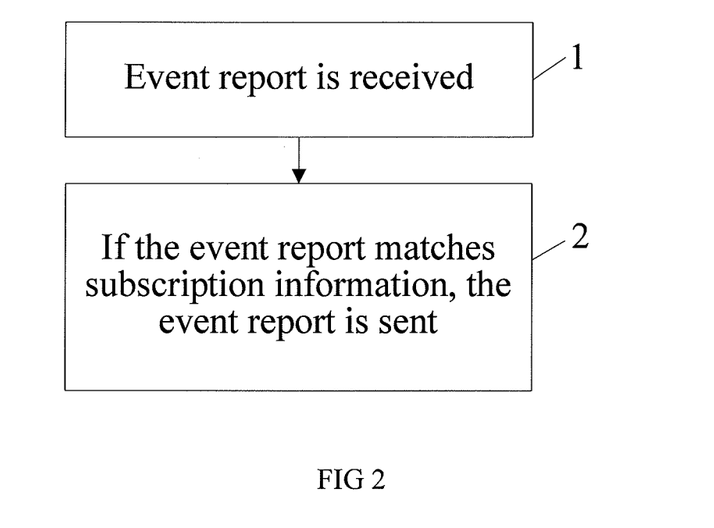
FIG. 2 shows a flowchart of the method for transferring information provided in an embodiment of the present invention.

A shown in FIG. 2, a method for transferring information is provided in an embodiment of the present invention, including the following:

Step 1: An event report is received.

The PCRF receives an event report from the BBERF.

Alternatively, the PCRF determines a type of triggering event to be sent to the BBERF according to a type of event report that the PCEF subscribe and other factors.

Step 2: If the event report matches event report subscription information, the event report is sent.

The PCRF obtains from the PCEF event report subscription information to be forwarded to the PCEF.

Alternatively, the PCRF obtains from the BBERF event report subscription information to be forwarded to the BBERF.

Figure 3:
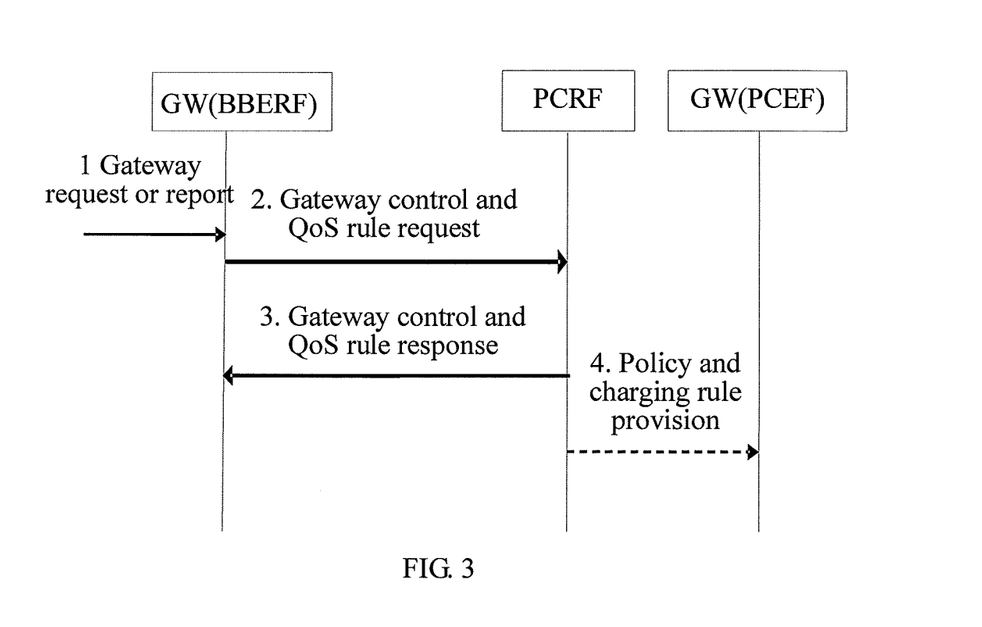
FIG. 3 shows the flowchart provided in an embodiment of the present invention for the PCRF to forward an event report from the BBERF to the PCEF.

Described below is embodiment one of the present invention. In this embodiment, the PCEF and/or BBERF notify or notifies the PCRF of an event report type to be forwarded actively in advance. When detecting an event, which matches a triggering event type sent from the PCRF, the BBERF reports the event to the PCEF. After receiving an event report, the PCRF matches the event report with PCEF event report subscription information. If the event report and the PCEF event report subscription information are matched, the PCRF forwards the event report to the PCEF. FIG. 3 shows the preceding process.

Step 1: The BBERF decides to report the event after detecting an event that matches a triggering event type sent from the PCRF.

Step 2: The BBERF sends a gateway control and QoS rule request message to the PCRF. The gateway control and QoS rule request message carries an event report or an affected QoS rule.

Optionally in this embodiment, the BBERF can update BBERF event report subscription to the PCRF through the gateway control and QoS rule request message. That is, the gateway control and QoS rule request message carries the indication of the updated event report type to be forwarded to the BBERF.

Step 3: After receiving the gateway control and QoS rule request message, the PCRF returns a response message of the gateway control and QoS rules to the BBERF. The response message may include a response of the event report receipt, updated QoS rule, and updated triggering event type to be reported.

Further, the PCRF can determine a type of triggering event to be sent to the BBERF according to a type of event report that the PCEF subscribe indicated in an IP-CAN session relating to a gateway control session and other factors.

Step 4: If the event report the PCRF receives from the BBERF matches PCEF event report subscription information, the PCRF forwards the event report to the PCEF through a policy and charging rule provisioning message.

In the present embodiment, the PCEF notifies the PCRF of a type of event report to be forwarded in advance and the PCRF only forwards the corresponding event report to the PCEF.

Figure 4:
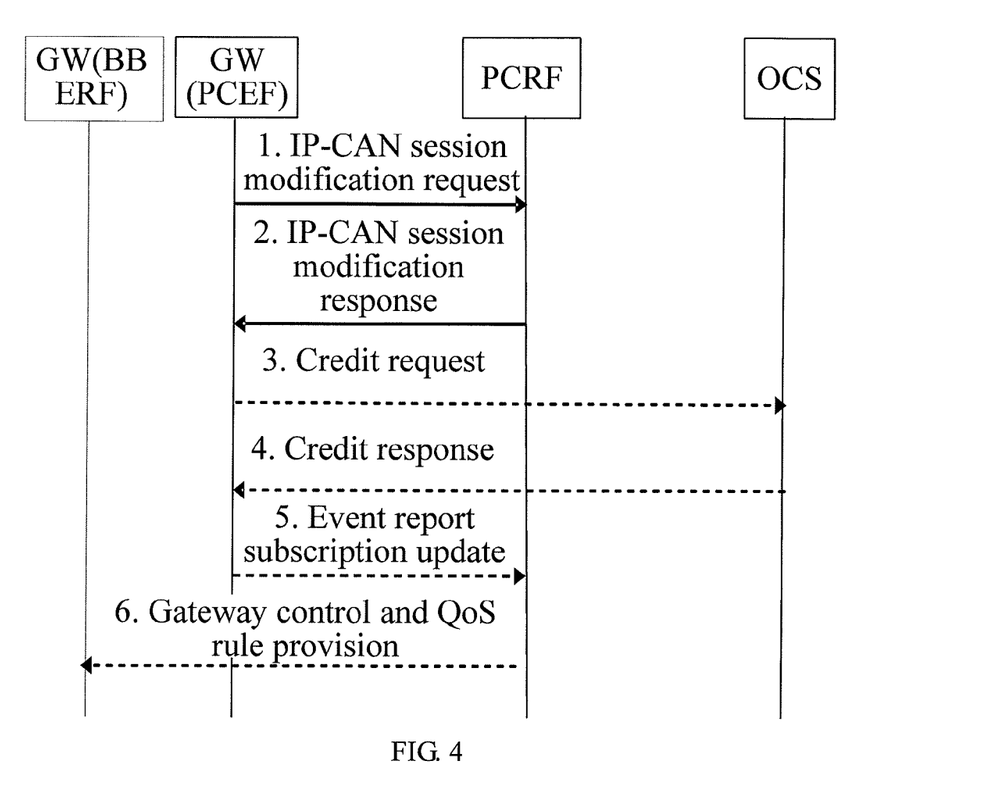
FIG. 4 shows the flowchart provided in an embodiment of the present invention for the PCRF to forward an event report from the PCEF to the BBERF.

Described below is Embodiment 2 of the present invention. In this embodiment, the PCEF and/or BBERF have/has notified the PCRF of an event report type to be forwarded actively in advance. When detecting an event, which matches a triggering event type sent from the PCRF, the PCEF reports the event to the PCRF. After receiving an event report, the PCRF matches the event report with BBERF event report subscription information. If the event report and the BBERF event report subscription information are matched, the PCRF forwards the event report to the BBERF. FIG. 4 shows the preceding process.

Step 1: The PCEF detects an event that matches the triggering event type sent from the PCRF and sends an IP-CAN session modification message to the PCRF to report the event. The P-CAN session modification message carries an event report and may carry an affected PCC rule.

Optionally in this embodiment, the PCEF can update event report subscription of the PCEF to the PCRF through an IP-SCAN session modification message. That is, the IP-SCAN session modification message carries the indication of an updated event report type to be forwarded to the PCEF.

Step 2: The PCRF returns a response message to the PCEF. The response message may include the event report receipt response, updated PCC rule, and updated triggering event type to be reported.

Further, the PCRF can determine a type of triggering event to be sent to the PCEF according to a type of event report to which the BBERF subscribes indicated in a gateway control session relating to an IP-CAN session and other factors.

Step 3: Optionally for online charging, the PCEF determines whether to request credit from the OCS according to the updated PCC rule.

Step 4: Optionally, a OCS returns credit information in a response message. In the response message, the OCS can also carry an updated type of credit reauthorization event to be sent to the PCEF to instruct the PCEF to request the OCS of credit reauthorization when an event that matches the type of credit reauthorization event occurs.

Step 5: The PCEF updates PCEF event report subscription to the PCRF according to the type of credit reauthorization event the PCEF has received.

Step 6: After receiving the event report that matches the BBERF subscription information from the PCEF, the PCRF forwards the event report to the BBERF.

It is noteworthy that Step 6 may not necessarily follow Steps 3-5 in time sequence.

In the present embodiment, the BBERF notifies the PCRF of the type of event report to be forwarded in advance and the PCRF only forwards the corresponding event report to the PCEF.

In an embodiment of the present invention, the PCRF only forwards an event report required for the BBERF and PCEF according to BBERF and/or PCEF subscription. Described below is the procedure, in which a network entity such as BBERF and PCEF registers a type of event report, required by the network entity, with the PCRF.

Figure 5:
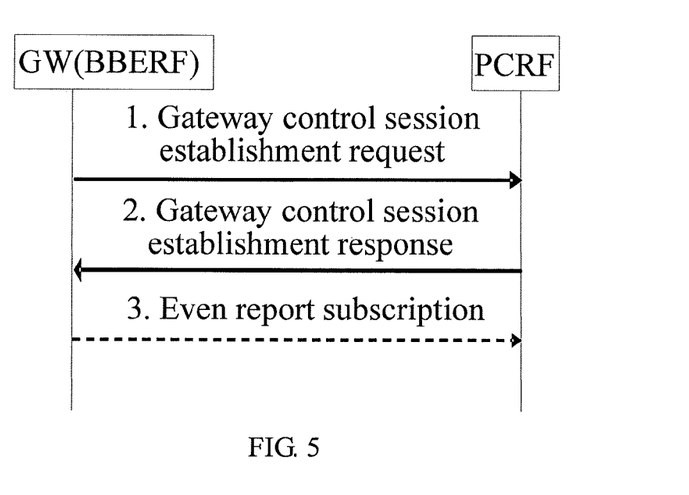
FIG. 5 shows the flowchart provided in an embodiment of the present invention for event report subscription when a gateway control session is established.

Embodiment 3 is described as follows: When a gateway control session is established between the BBERF and PCRF, the BBERF registers the type of event report the BBERF requires with the PCRF, as shown in FIG. 5.

Step 1: The BBERF decides to establish a gateway control session and sends a request to the PCRF for establishing a gateway control session.

It is noteworthy that the BBERF may register the required event report subscription with the PCRF through a message of gateway control session establishment. That is, the message of gateway control session establishment may carry an indication of event report type to be forwarded to the BBERF.

Step 2: The PCRF stores the indication of event report type to be forwarded to BBERF and returns a response to the gateway control session establishment message. The response to the gateway control session establishment message carries a QoS rule forwarded to the BBERF and a trigging event type that requires BBERF monitoring.

The PCRF can determine a type of triggering event to be sent to the BBERF according to the event report type that the PCEF subscribe indicated in an IP-CAN session relating to the gateway control session and other factors.

Step 3: Optically, the BBERF can register the type of event report the BBERF requires with the PCRF through a new message other than the message of gateway control session establishment. The new message carries the event report type to be forwarded to the BBERF. If Step 3 is present, the BBERF sends a gateway control session establishment message in Step 1 in the same way as used in the prior art. Therefore, no more details will be given herein.

In this embodiment, the PCRF may acquire the type of event report that the BBERF requires when a gateway control session is established between the BBERF and PCRF, and therefore, when any event occurs, the event report may be forwarded selectively.

Figure 6:
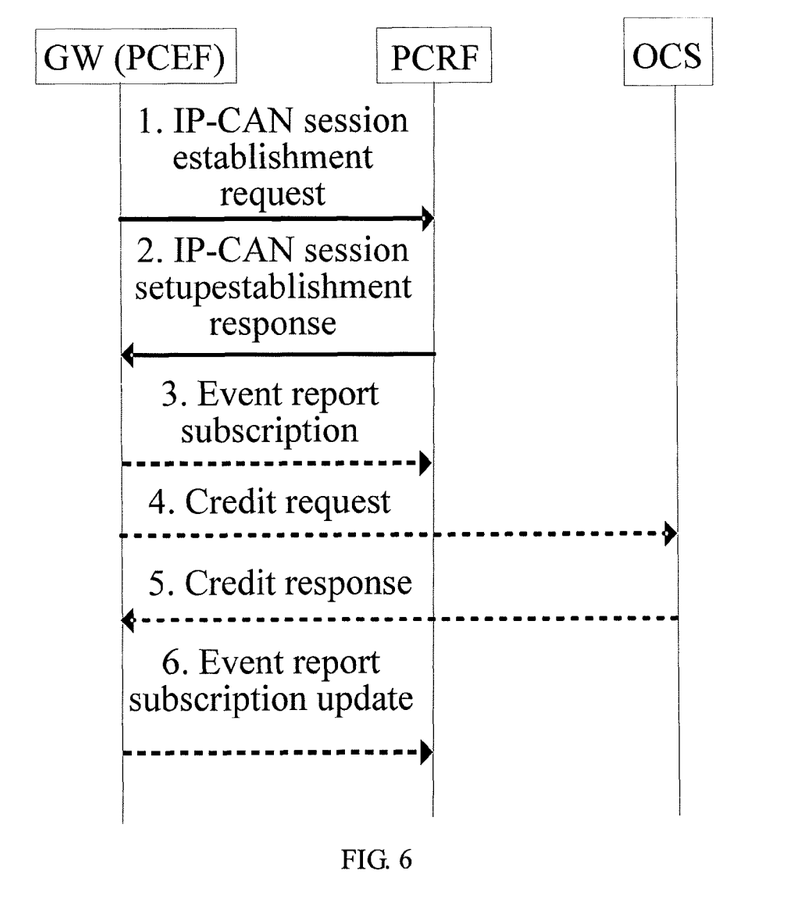
FIG. 6 shows the flowchart provided in an embodiment of the present invention for event report subscription when an IP-CAN session is established.

Embodiment 4 is described as follows: When an IP-CAN session is established between the PCRF and PCRF, the PCEF registers a type of event report the PCEF requires with the PCRF, as shown in FIG. 6.

Step 1: The PCEF decides to establish an IP-CAN session and sends an IP-CAN session establishment request message to the PCRF.

It is noteworthy that the PCEF may register a type of event report the PCEF requires with the PCRF through the IP-CAN session establishment request message. That is, the IP-CAN session establishment request message may carry the indication of the event report type to be forwarded to the PCEF.

Step 2: The PCRF returns a response to the IP-CAN session establishment message. The response message carries a PCC rule sent to the PCEF and a trigging event type that requires PCEF monitoring. The PCRF can determine the triggering event type to be sent to the PCEF according to a type of event report that the PCEF subscribe indicated in a gateway control session relating to the IP-CAN session and other factors.

Step 3: Optionally, the PCEF can register the type of event report the PCEF requires with the PCRF through a new message other than a IP-CAN session establishment message. The new message may carry the type of event report type to be forwarded to the PCEF.

Step 4: Optionally for online charging, the PCEF requests credit from an OCS according to the received PCC rule.

Step 5: Optionally, the OCS returns credit information in a response message. In the response message, the OCS may also carry a type of credit reauthorization event to be sent to the PCEF to instruct the PCEF to request the OCS of credit reauthorization when an event that matches the type of credit reauthorization event occurs.

Step 6: Optionally, the PCEF updates PCEF event report subscription to the PCRF according to the type of credit reauthorization event the PCEF has received.

It is noteworthy that Step 6 may not necessarily follow Steps 3-5 in time sequence.

In this embodiment, the PCRF may acquire the type of event report that PCEF requires when a gateway control session is established between the PCEF and PCRF, and therefore, when an event occurs, the event report may be forwarded selectively.

Figure 7:
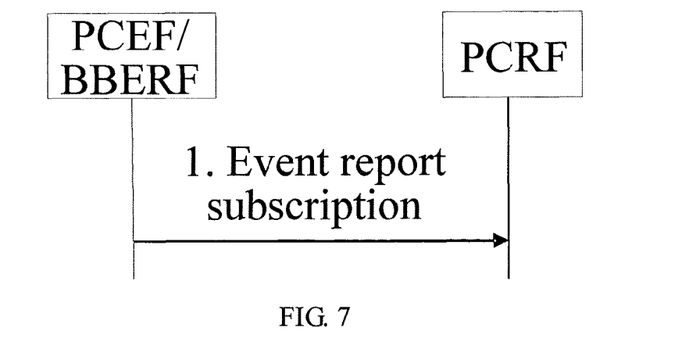
FIG. 7 shows the flowchart provided in an embodiment of the present invention for event report subscription.

Described below is Embodiment 5, where the PCEF or BBERF may register event reports for the first time anytime after an IP-CAN or gateway control session is established according to needs if the PCEF or BBERF fails to register event reports during the process of session establishment. FIG. 7 shows the preceding process.

Step 1: The PCRF and/or BBERF can send a request message to the PCRF for event report subscription when necessary.

For the PCEF, the message can either be created separately or be an IP-CAN session modification message. For the BBERF, the message can either be created separately or be a gateway control and QoS rule request message.

It is noteworthy that before the PCEF or BBERF sends the first event report subscription to the PCRF, the PCRF may determine whether to forward a reported event report according to operator's configuration or a default processing method.

Figure 8:
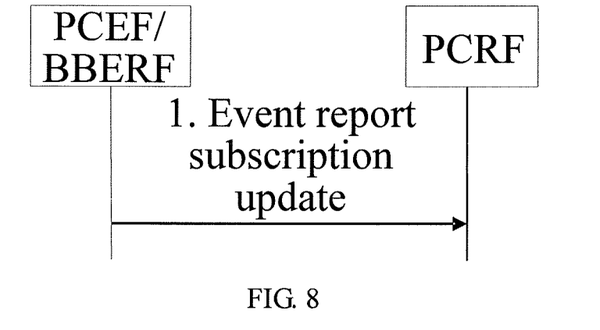
FIG. 8 shows the flowchart provided in an embodiment of the present invention for event report subscription update.

Described below is Embodiment 6. After subscription, the PCEF or BBERF can update subscription information as shown in FIG. 8.

The PCRF and/or BBERF can send a request message to the PCRF for updating event report subscription information when necessary. For the PCEF, the message can either be created separately or be an IP-CAN session modification message. For the BBERF, the message can either be created separately or be a gateway control and QoS rule request message. The message for event report subscription update and the message for first-time event report subscription can be the same or separate messages.

Embodiments 3 to 6 described earlier enable the PCRF to acquire a type of event report that the PCEF or BBERF requires to be forwarded when an IP-CAN session or gateway control session is established or before an event report is forwarded, and therefore, the PCRF is capable of choosing to forward event reports as needed.

Embodiment 7 of the present invention is provided, which enables the PCEF and BBERF to forward any information other than a triggering event to the other side through PCRF. The method for the BBERF to forward any information other than a triggering event from the PCRF to the PCEF is detailed in FIG. 9.

Figure 9:
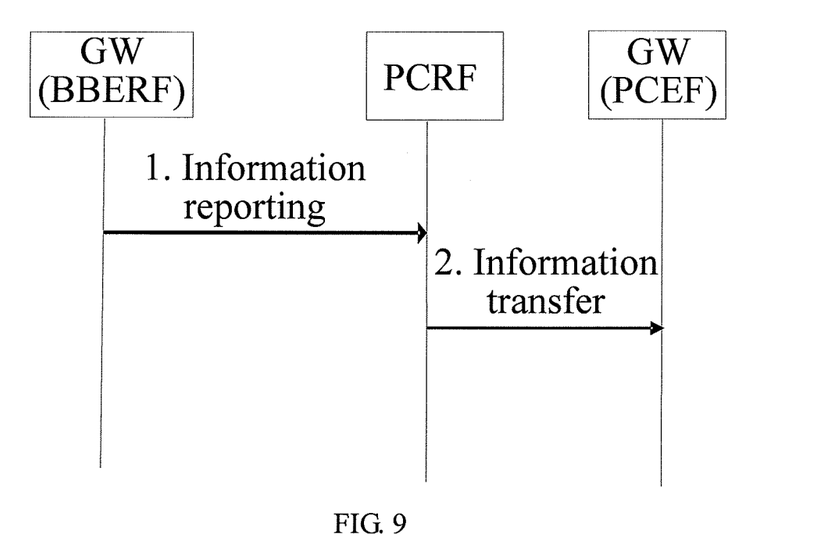
FIG. 9 shows the flowchart provided in an embodiment of the present invention for the PCRF to forward any information other than a triggering event from the BBERF to the PCEF.

Step 1: After determining the need to transfer information other than a triggering event to the PCEF, the BBERF sends a message that carries the information to be transferred to the PCRF. Specifically, information can be reported by using a message for event reporting. However, a parameter type specially designed for information reporting is set in the message for event reporting, or the message is the same as the message for event reporting without amending a parameter type but a flag to indicate that an event report does not need to match with event report subscription is added in the message for event reporting, or uses a message that differs from that for event reporting.

Step 2: After receiving the information from the BBERF, the PCRF forwards the information to the PCEF.

A method is provided in Embodiment 7 for the PCEF to forward information other than a triggering event to the BBERF via the PCRF. The embodiment 7 works in a similar way. The difference is that the PCEF forwards information to the BBERF. No more details will be given herein.

An embodiment of the present invention is based on a PCC architecture that a BERF and a Gxx exist. In the case of roaming, the BBERF and PCEF can reside on a gateway entity in a visited network. In this situation, non-roaming subscribers connect to home PCRF, while roaming subscribers connect to either a visited PCRF or home PCRF forwarded to the home network through the visited PCRF. Embodiments of the present invention also apply to the case of roaming mentioned above. The procedures for realizing these embodiments are similar. Thus, no more details are given herein.

Figure 10:
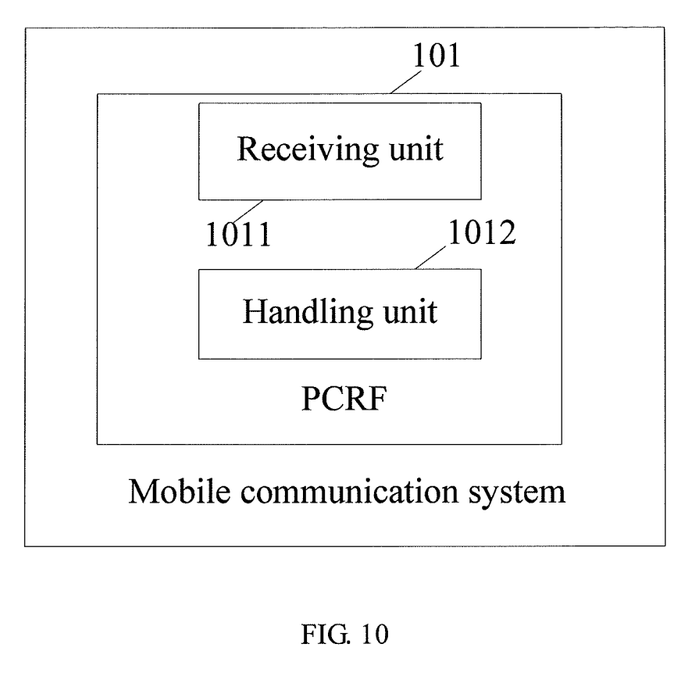
FIG. 10 shows the mobile communications system provided in an embodiment of the present invention.

Discussed below is an embodiment of the mobile communication system in the present invention. It is understandable that the system involved in an embodiment of the present invention may comprise many other entities that provide communication capabilities. The embodiment will not detail standard technologies in the communication domain, which may be disclosed in other prior technologies. For the purpose of describing solutions disclosed in the embodiments of the present invention, only main parts of the system are mentioned herein. As shown in FIG. 10, the system comprises a PCRF 101, which is configured to communicate with other network entities, and the PCRF 101 further comprises:

a receiving unit 1011, configured to receive an event report; and a processing unit 1012, configured to send the event report according to the match between the event report received by the receiving unit 1011 and event report subscription information.

Those skilled in the art can understand that the procedures discussed earlier can be implemented by a program that sends instructions to hardware. Such programs can be stored on computer readable storage media, such as read-only memory, disk or CD-ROM. The program comprises the following procedures: receiving an event report; and matching the event report with event report subscription information and sending the event report. Storage media mention above includes read-only memory, disk or CD-ROM.

Although the present invention is illustrated and described through preferred embodiments, those skilled in the art should understand that various modifications and variations can be made to the invention in form and detail without departing from the spirit and scope of the invention.

What is claimed is:

1. A method for transferring information in a Policy and Charging Control (PCC) system, comprising:

obtaining, by a policy and charging rule function (PCRF), registration of subscription for an event report required by a Policy and Charging Enforcement Function (PCEF); wherein the PCRF is a network entity in the PCC system and is configured to set a PCC rule, and the PCRF communicates with the PCEF which locates in a gateway in the PCC system for implementing the PCC rule as indicated by the PCRF;

matching, by the PCRF, an event report with the subscription information after receiving the event report, and forwarding, by the PCRF, the event report to the PCEF if the received event report matches the subscription information;

wherein the registration of subscription is by the PCRF for an event report from a Bearer Binding and Event Report Function (BBERF), wherein the BBERF is a network entity to execute a Quality of Service (QoS) rule in the PCC system.

2. The method for transferring information according to claim 1, wherein the step of obtaining is performed after an IP Connectivity Access Network (IP-CAN) session between the PCRF and the PCEF is established, and includes obtaining by the PCRF modified subscription information of the PCEF carried in an IP-CAN session modification message from the PCEF.

3. The method for transferring information according to claim 1, wherein the obtaining by the PCRF of the event report subscription information of the PCEF from the PCEF comprises:

obtaining, by the PCRF, an IP Connectivity Access Network (IP-CAN) session establishment message from the PCEF, wherein the IP-CAN session establishment message carries the event report subscription information of the PCEF; or when establishing an IP-CAN session, obtaining, by the PCRF, an event report subscription message from the PCEF, wherein the event report subscription message carries the event report subscription information of the PCEF; and the event report subscription message is separate from the IP-CAN session establishment message.

4. The method of information transfer according to claim 1, wherein before receiving the event report, the method further comprises:

sending by the PCRF, a triggering event to the BBERF according to an event report type in the subscription information to which the PCEF subscribes in the PCRF; and receiving the event report from the BBERF.

5. The method for transferring information according to claim 1, wherein the forwarding of the event report is:

forwarding by the PCRF, the event report to the BBERF through a gateway control and QoS rule provision message.

6. The method for transferring information according to claim 1, wherein: before receiving the event report, the method further comprises:

sending, by the PCRF, a triggering event to a policy and Charging Enforcement Function (PCEF) according to an event report type in the subscription information to which the BBERF subscribes in the PCRF, and receiving the event report from the PCEF.

7. The method for transferring information according to claim 2, wherein: after receiving the event report, the method further comprises, in the case of online charging, obtaining, by the PCRF, an event report subscription update from the PCEF, wherein the event report subscription is sent by the PCEF after the PCEF receives a type of a credit reauthorization event.

8. A policy and charging rule function (PCRF) as a network entity in a Policy and Charging Control (PCC) system, comprising:

a receiving unit, configured to receive an event report; match the event report with a subscription for an event report required by a Policy and Charging Enforcement Function (PCEF); wherein the PCRF is configured to set a PCC rule, and the PCRF communicates with the PCEF which locates in a gateway in the PCC system for implementing the PCC rule as indicated by the PCRF; wherein subscription is by the PCEF for an event report from a Bearer Binding and Event Report Function (BBERF), wherein the BBERF is a network entity to execute a Quality of Service (QoS) rule in the PCC system; and a processing unit, configured to forward the event report to the PCEF if the event report received by the receiving unit matches the subscription information.

9. A Policy and Charging Control (PCC) system, wherein the system comprises a Policy and Charging Rule Function (PCRF) which is a network entity in the PCC system and is configured to set a PCC rule, and a Policy and Charging Enforcement Function (PCEF) which locates in a gateway in the PCC system for implementing the PCC rule as set by the PCRF; wherein:

the PCEF is configured to notify the PCRF of an event report type to be forwarded on the PCEF's own initiative in advance wherein the notification is carried out through registration of subscription to the PCRF or an IP Connectivity Access Network (IP-CAN) session message;

the PCRF is configured to obtain registration of subscription by the PCEF for an event report required by the PCEF; wherein the event report is from a Bearer Binding and Event Report Function (BBERF), wherein the BBERF is a network entity to execute a Quality of Service (QoS) rule in the PCC system; and the PCRF comprises:

a receiving unit, configured to receive an event report; wherein the PCRF matches the event report with the subscription information after receiving the event report; and a processing unit, configured to forward the event report to the PCEF if the event report received by the receiving unit matches subscription information.

* * * * *